United States Patent
Aoki et al.

(10) Patent No.: US 9,830,938 B1
(45) Date of Patent: Nov. 28, 2017

(54) SUSPENSION ASSEMBLY, MAGNETIC HEAD SUSPENSION ASSEMBLY, AND DISK DEVICE HAVING THE SAME

(71) Applicant: KABUSHIKI KAISHA TOSHIBA, Tokyo (JP)

(72) Inventors: Kenichiro Aoki, Machida Tokyo (JP); Masaya Kudo, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/448,500

(22) Filed: Mar. 2, 2017

(30) Foreign Application Priority Data

Sep. 2, 2016 (JP) .................................. 2016-171912

(51) Int. Cl.
*G11B 5/48* (2006.01)

(52) U.S. Cl.
CPC ............ *G11B 5/483* (2015.09); *G11B 5/4853* (2013.01)

(58) Field of Classification Search
None
See application file for complete search history.

(56) References Cited

U.S. PATENT DOCUMENTS

| | | | |
|---|---|---|---|
| 7,375,930 B2 * | 5/2008 | Yang ..................... | G11B 5/5552 360/294.4 |
| 7,843,666 B2 | 11/2010 | Yao et al. | |
| 7,957,101 B2 * | 6/2011 | Matsui ................. | G11B 5/4853 29/603.03 |
| 8,289,654 B2 | 10/2012 | Kuwajima | |
| 8,310,790 B1 * | 11/2012 | Fanslau, Jr. ............ | G11B 5/483 360/294.4 |
| 8,885,294 B2 | 11/2014 | Kudo | |
| 9,047,896 B1 | 6/2015 | Kudo et al. | |
| 2004/0037008 A1 * | 2/2004 | Yao ...................... | G11B 5/4826 360/294.3 |
| 2008/0266713 A1 * | 10/2008 | Yao ...................... | G11B 5/4853 360/234.6 |
| 2010/0246067 A1 * | 9/2010 | Fujimoto ............. | G11B 5/4833 360/246.1 |

FOREIGN PATENT DOCUMENTS

| | | |
|---|---|---|
| JP | 2011-138596 A | 7/2011 |
| JP | 2014139854 A | 7/2014 |
| JP | 5766860 B2 | 8/2015 |

* cited by examiner

*Primary Examiner* — Will J Klimowicz
(74) *Attorney, Agent, or Firm* — Patterson & Sheridan, LLP (57) ABSTRACT

A suspension assembly includes a support plate, a wiring member, and a driving element. The wiring member includes a metal plate, an insulating layer, and a conductive layer. The metal plate includes a base end plate, a support portion on a projection portion formed on the support plate, and a pair of link portions which connect the base endplate to the support portion. The insulating layer includes a first end portion on the support portion, and a pair of bridge portions which are respectively provided in parallel with the link portions and extend from a second end portion that is on the base end plate to the first end portion. The driving element deforms in response to a voltage applied thereto to move the support portion. Each link portion includes a bent portion at a location of a straight line passing through a central region of the driving element.

20 Claims, 8 Drawing Sheets

SUSPENSION ASSEMBLY, MAGNETIC HEAD SUSPENSION ASSEMBLY, AND DISK DEVICE HAVING THE SAME

CROSS-REFERENCE TO RELATED APPLICATION

This application is based upon and claims the benefit of priority from Japanese Patent Application No. 2016-171912, filed Sep. 2, 2016, the entire contents of which are incorporated herein by reference.

FIELD

Embodiments described herein relate generally to a suspension assembly, a magnetic head suspension assembly, and a disk device having the same.

BACKGROUND

Generally, a disk device, for example, a magnetic disk device includes a magnetic disk which is provided on a base, a spindle motor which supports, rotates, and drives the magnetic disk, and a suspension assembly which supports a magnetic head. The suspension assembly includes a suspension which is attached to a front end portion of an arm, a wiring member (flexure, wiring trace) which is disposed on the suspension, and a load beam. The magnetic head is supported by a gimbal portion of the wiring member, and a head suspension assembly is formed thereby.

Recently, a suspension assembly design has been proposed in which a piezoelectric element (PZT element) that functions as a drive element is mounted near the gimbal portion of the wiring member and micro-displacement is generated in the magnetic head in a seek direction by expansion/contraction operations of the piezoelectric element. According to such a suspension assembly, it is possible to finely control an operation of the magnetic head by controlling a voltage which is applied to the piezoelectric element.

In the suspension assembly design described above, when a piezoelectric element is expanded or contracted, the piezoelectric element is bent in a direction of a thickness thereof, and a plurality of resonance modes can occur therein as a result. As a consequence, positioning accuracy of the magnetic head may decrease.

DETAILED DESCRIPTION

Embodiments provide a suspension assembly, a magnetic head suspension assembly, and a disk device including the same, which can increase positioning accuracy of a head.

In general, according to one embodiment, a suspension assembly includes a support plate, a wiring member, and a driving element. The support plate includes a front end portion in which a projection portion is formed along a center longitudinal axis of the suspension assembly. The wiring member includes a metal plate on the support plate, the metal plate including a base end plate portion which is fixed to the support plate, a support portion which is separated from the base end plate portion and is positioned on the projection portion, and a pair of link portions which extend on both sides of the support portion and connect the base end plate portion to the support portion, an insulating layer on the metal plate, the insulating layer including a first end portion on the support portion, and a pair of bridge portions which are respectively provided in parallel with the link portions and extend from a second end portion that is on the base end plate portion to the first end portion, and a conductive layer on the insulating layer, the conductive layer having a plurality of wires, the conductive layer including a plurality of wires which extend from the second end portion to the first end portion. The driving element is affixed to one of the bridge portions, and deforms in response to a voltage applied thereto to move the support portion. Each of the link portions includes a bent portion that is bent at a location thereof that is substantially aligned with a straight line that extends in a direction orthogonal to the center longitudinal axis and passes through a central region of the driving element.

Hereinafter, a hard disk drive (HDD), which functions as a disk device, according to an embodiment will be described in detail with reference to the drawings.

Disclosure is provided herein by way of an example, and the technology or the like may be appropriately changed by those skilled in the art, while keeping the gist of the embodiments of the present disclosure. Such modifications are naturally included in the scope of embodiments of the present disclosure. In addition, there is a case where the drawings are schematically illustrated with respect to a width, a thickness, a shape or the like of each portion, for the sake of clearer illustration, but the drawings are just examples, and are not intended to limit the scope of the embodiments of the present disclosure. In addition, in the present specification and each figure, the same symbols or reference numerals are given to the same elements that are illustrated in different figures, and detailed description thereof will be repeated only as needed.

Figure 1:
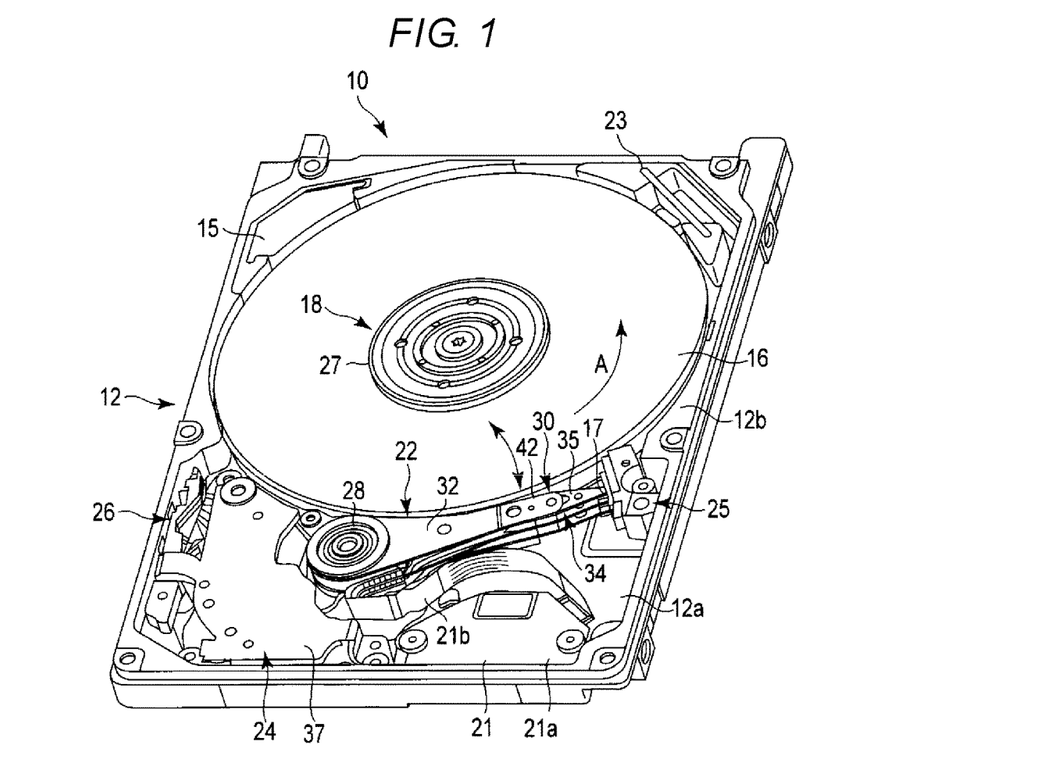
FIG. 1 is a perspective view illustrating a hard disk drive (HDD) according to a first embodiment.

FIG. 1 illustrates an internal structure of the HDD according to the embodiment. As illustrated in FIG. 1, the HDD includes a case 10. The case 10 includes a rectangular box-shaped base 12 with open top, and a top cover (not illustrated) which closes an upper end opening of the base 12. The base 12 includes a rectangular bottom wall 12a and a side wall 12b which is erected along a periphery of the bottom wall.

Two magnetic disks 16 which function as recording media, and a spindle motor 18 which functions as a drive unit that supports and rotates the magnetic disks 16 are provided in the case 10. The spindle motor 18 is disposed on the bottom wall 12a. The magnetic disks 16 are coaxially fitted to a hub (not illustrated) of the spindle motor 18, clamped by a clamp spring 27, and fixed to the hub. The magnetic disks 16 are supported in parallel with the bottom wall 12a of the base 12. In addition, the magnetic disks 16 are rotated in a direction of an arrow A at a predetermined speed by the spindle motor 18.

A plurality of magnetic heads 17, each of which records information on and reproduces the information from one of the magnetic disks 16, and a head stack assembly (hereinafter, referred to as HSA) 22 which movably supports the magnetic heads 17 above the magnetic disks 16 are provided in the case 10. In addition, a voice coil motor (hereinafter, referred to as VCM) 24 which rotates and positions the HSA 22, a ramp load mechanism 25 which supports the magnetic heads 17 in an unloaded position so that they are separated from the magnetic disk 16 when they are moved to an outermost circumference of the magnetic disk 16, a latch mechanism 26 which retains the HSA 22 in a retraction position when impact or the like acts on the HDD, and a substrate unit 21 having a conversion connector or the like, are provided in the case 10.

A printed circuit substrate (not illustrated) is screwed to an external surface of the bottom wall 12a of the base 12. The printed circuit substrate controls operations of the VCM 24 and the magnetic heads 17, and controls an operation of the spindle motor 18, through the substrate unit 21. A circulation filter 23 which captures dust which is generated in the case due to operation of a movable portion is provided on the side wall 12b of the base 12, and is positioned on an external side of the magnetic disk 16. In addition, a breath filter 15 which captures dust from air flowing into the case 10 is provided on the side wall 12b.

As illustrated in FIG. 1, the HSA 22 includes a rotatable bearing unit 28, four arms 32 which are attached to the bearing unit 28 in a stacked state, a suspension assembly 30 extending from the respective arms 32, and spacer rings (not illustrated) which are respectively disposed between the arms 32 in a stacked manner. Each arm 32 is formed in a long, narrow and flat shape by, for example, stainless steel, aluminum, or the like. The arm 32 has a front end portion on an extended end side, and a caulking seat surface having a caulking hole (not illustrated) is formed in the front end portion.

Figure 2:
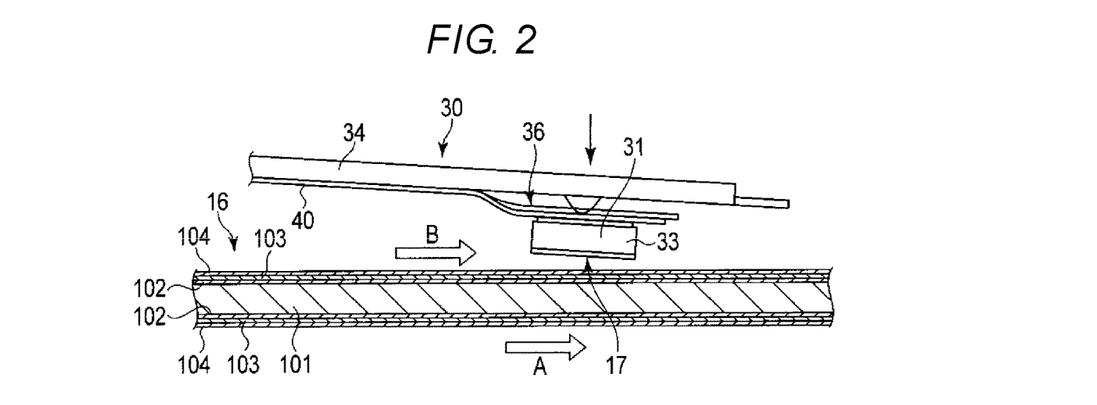
FIG. 2 is a side view illustrating a magnetic head and a suspension of a head suspension assembly, and a magnetic disk in the HDD.

FIG. 2 schematically illustrates the magnetic head and the magnetic disk in a floating state. As illustrated in FIGS. 1 and 2, the magnetic disk 16 includes a disk-shaped substrate 101, which is configured with a non-magnetic material, of a diameter of, for example, approximately 2.5 inches (6.35 cm). Soft magnetic layers 102, each being configured with a material showing soft magnetic characteristics as a base layer, are formed on both surfaces of the substrate 101. Magnetic recording layers 103 formed on the soft magnetic layers and protection film layers 104 formed on upper layers of the magnetic recording layers, are sequentially stacked on both surfaces of the substrate 101.

As illustrated in FIG. 2, the magnetic head 17 includes a slider 31 which is formed in a substantially rectangular parallelepiped shape and a head portion 33 which is formed on an end portion on an outflow end (trailing) side of the slider. The magnetic heads 17 are supported by a front end portion of a suspension 34 through a gimbal portion 36 of a flexure which will be described below. The magnetic head 17 is floated by an air flow B which is generated between a front surface of the magnetic disk 16 and the slider 31 by rotation of the magnetic disk 16. A direction of the air flow B coincides with a rotation direction A of the magnetic disk 16. The slider 31 is disposed on the magnetic disk 16 such that a longitudinal direction of the slider 31 substantially coincides with the direction of the air flow B.

Figure 3:
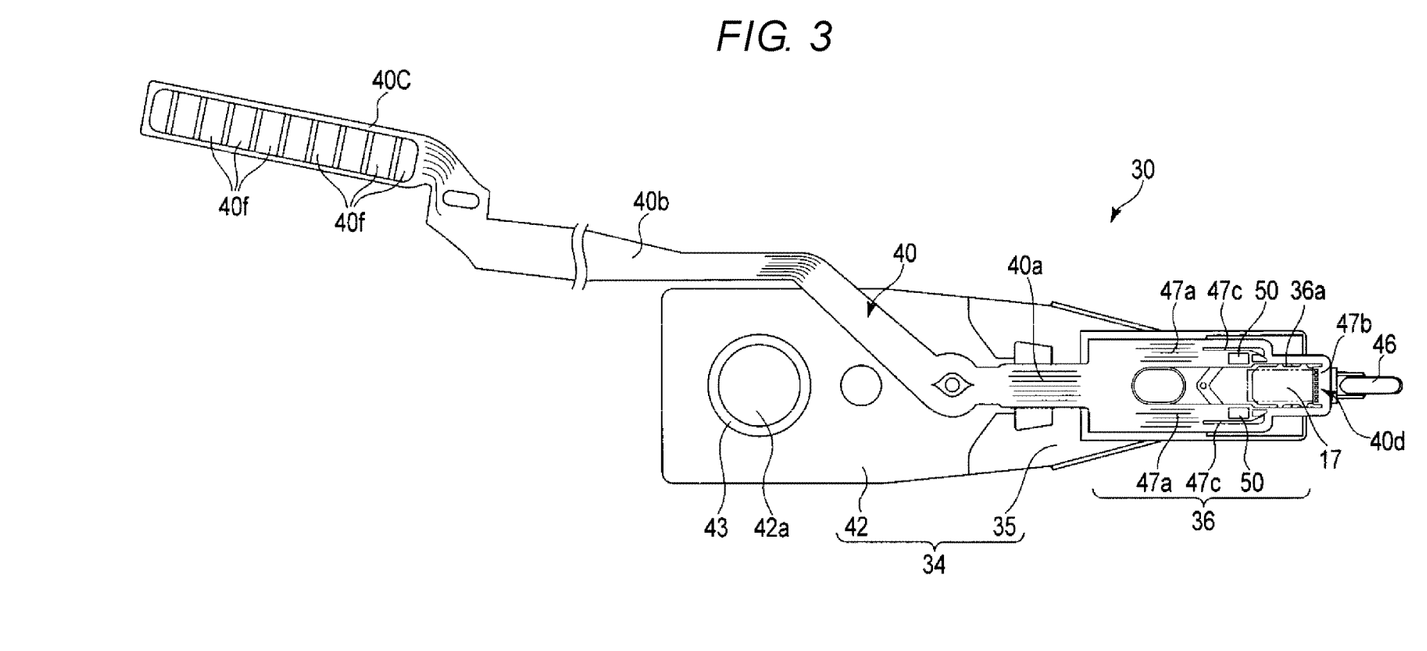
FIG. 3 is a plan view of the head suspension assembly.

Next, a configuration of the suspension assembly 30 will be described in detail. FIG. 3 is a plan view of the suspension assembly, and FIG. 4 is a perspective view of the suspension assembly.

Figure 4:
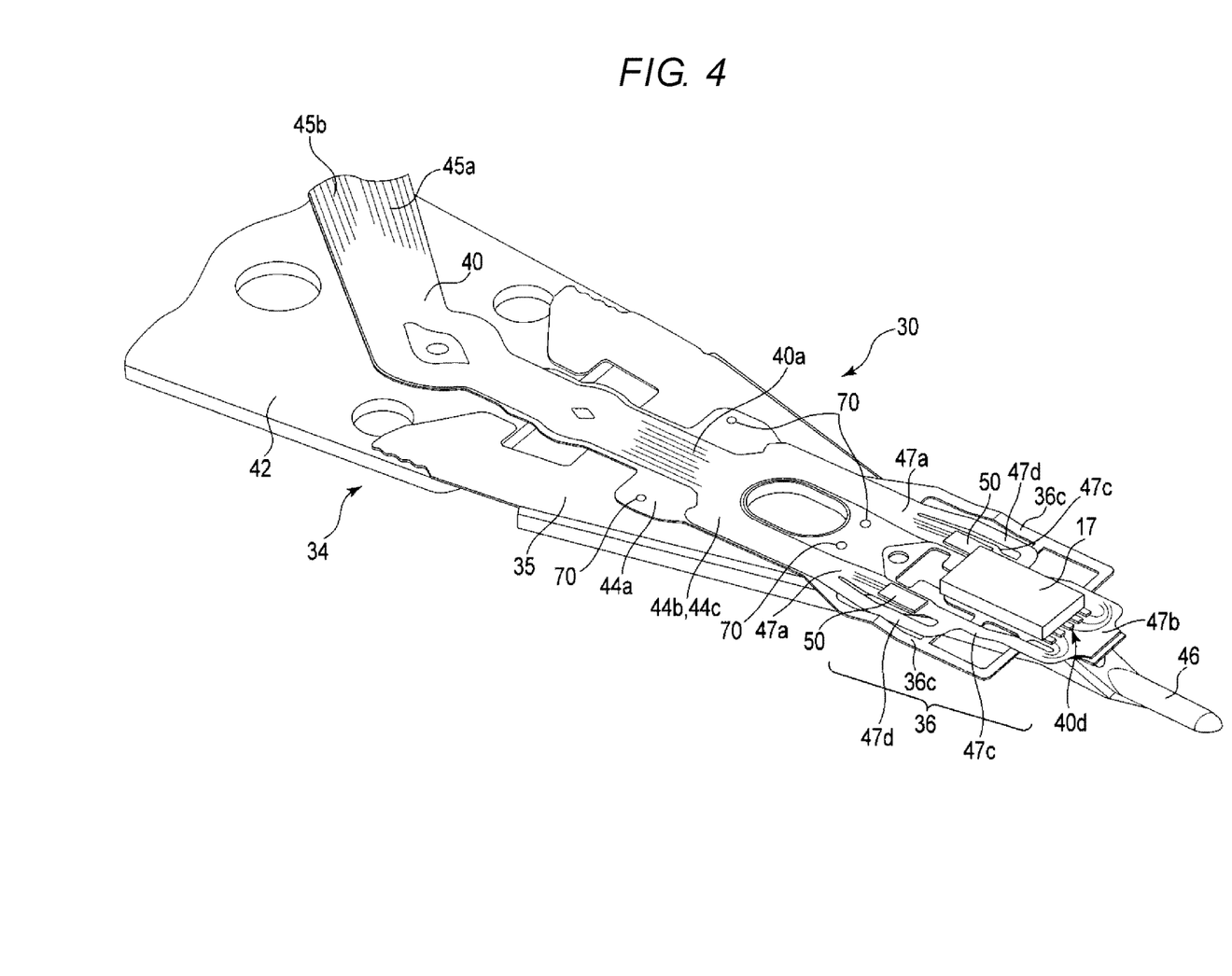
FIG. 4 is a perspective view illustrating the head suspension assembly.

As illustrated in FIGS. 1, 3, and 4, each suspension assembly 30 includes the suspension 34 extended from the arm 32, and the magnetic head 17 is attached to a front end portion of the suspension 34. The magnetic head 17 and the suspension assembly 30 which supports the magnetic head are collectively referred to as a head suspension assembly.

The suspension 34 which functions as a support plate includes a rectangular base plate 42 which is configured with a metal plate with a thickness of several hundred microns, and a load beam 35 of a long and narrow plate spring shape which is configured with a metal plate with a thickness of dozens of microns. The load beam 35 has a base end portion disposed on a front end portion of the base plate 42 in an overlapped manner, and is fixed to the base plate 42 by welding at several places thereof. A width of the base end portion of the load beam 35 is approximately equal to a width of the base plate 42. A tab 46 of a rod shape protrudes from a front end of the load beam 35.

The base plate 42 includes a circular opening 42a in a base end portion and an annular protrusion portion 43 which is positioned around the opening. The base plate 42 is fastened to a front end portion of the arm 32 by fitting the protrusion portion 43 to the circular caulking hole (not illustrated) formed in the caulking seat surface of the arm 32 and caulking the protrusion portion 43. A base end of the base plate 42 may be fixed to a front end of the arm 32 by laser welding, spot welding or adhesion.

The suspension assembly 30 includes a pair of piezoelectric elements (PZT elements) 50, and a flexure (wiring member) 40 having a long and narrow strip shape and transmitting recording and reproduction signals and a drive signal for the piezoelectric element 50. As illustrated in FIGS. 3 and 4, in the flexure 40, a front end side portion 40a is attached to the load beam 35 and the base plate 42, a rear half portion (extending portion) 40b extends toward the outside from a side edge of the base plate 42 and extends along a side edge of the arm 32. In addition, a connection end portion 40c positioned on a front end of the extending portion 40b includes a plurality of connection pads 40f, and the connection pads 40f are connected to a main FPC 21b which will be described below.

A front end portion of the flexure 40 which is positioned on a front end portion of the load beam 35 configures the gimbal portion 36 which functions as an elastic support portion. The magnetic head 17 is mounted and fixed on the gimbal portion 36, and is supported by the load beam 35 through the gimbal portion 36. The pair of piezoelectric elements 50 which functions as a drive member or drive element that expands and contracts upon application of a voltage or a current is attached to the gimbal portion 36, and is positioned on a base end side of the load beam 35 with respect to the magnetic head 17.

Figure 5:
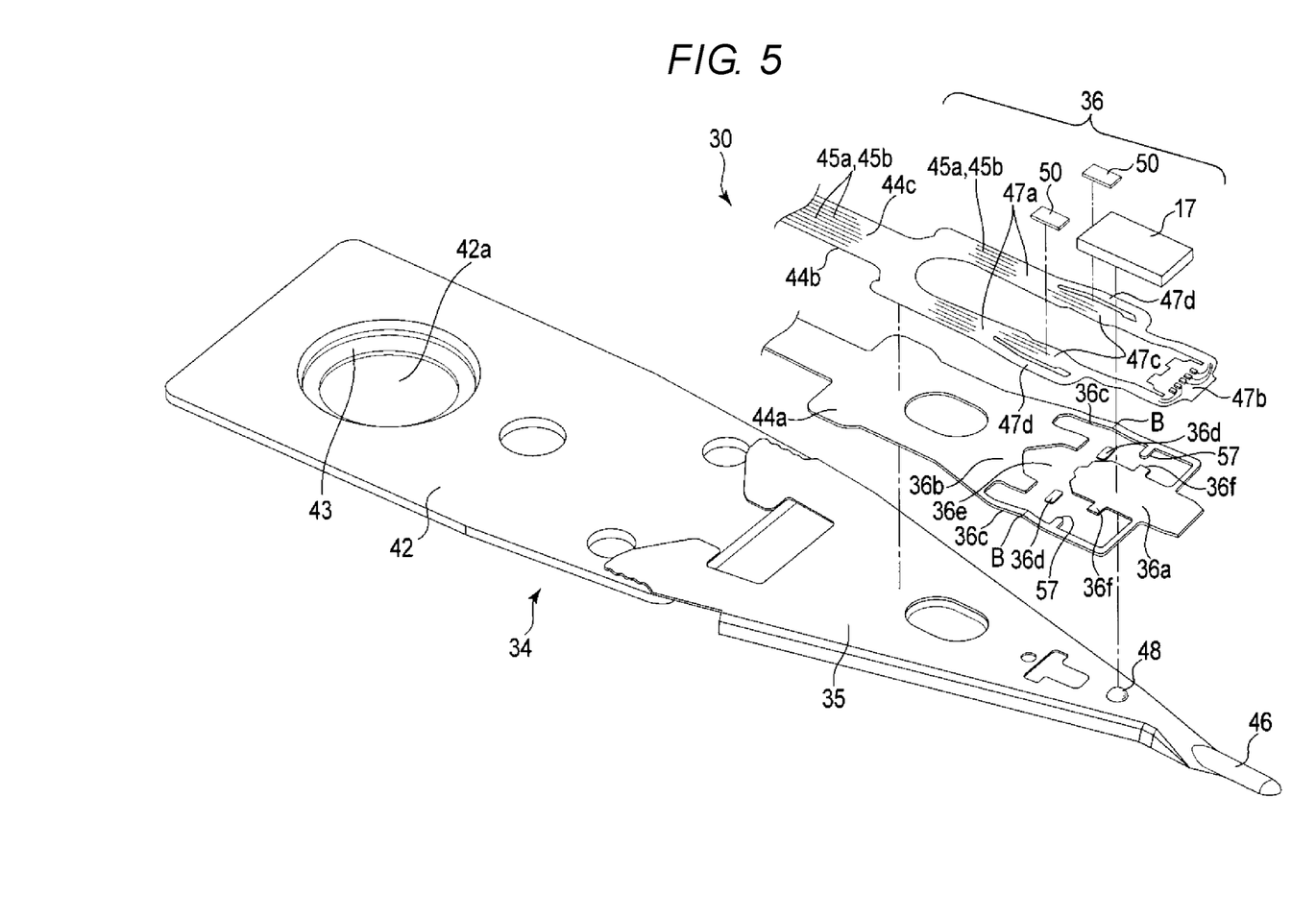
FIG. 5 is an exploded perspective view illustrating the magnetic head, a piezoelectric element, a flexure, and a load beam of the head suspension assembly.
Figure 6:
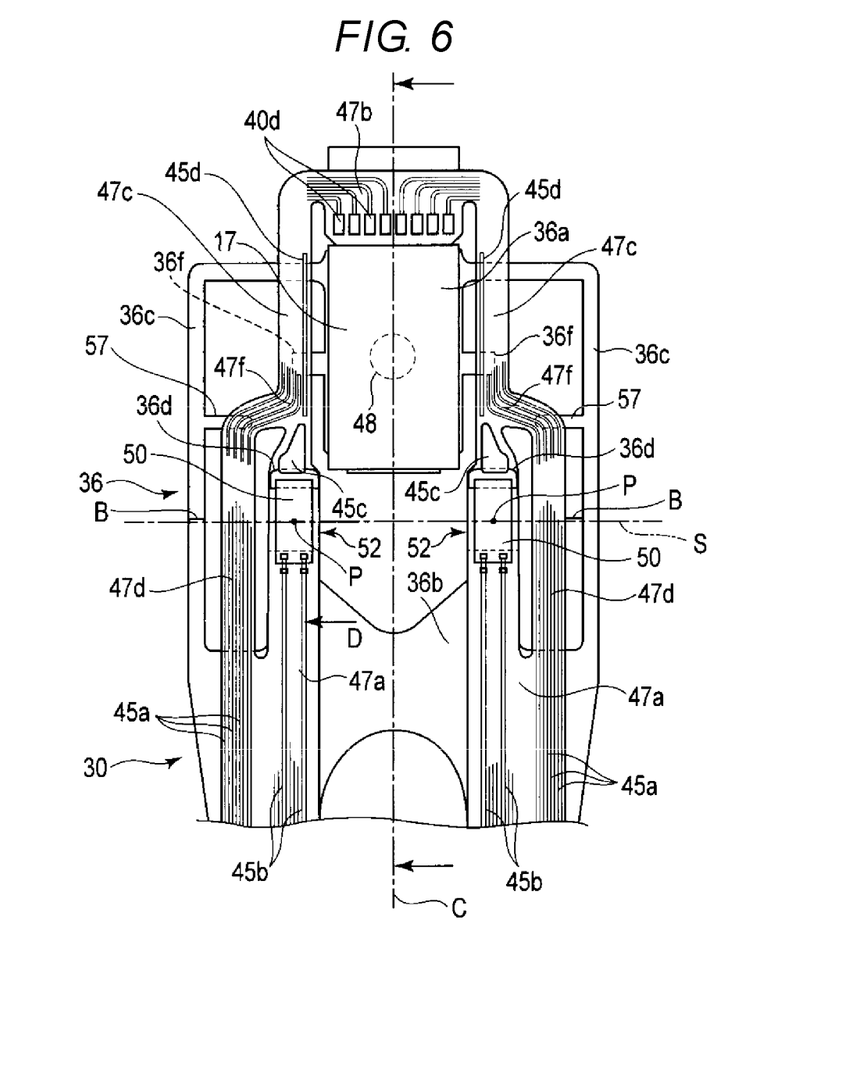
FIG. 6 is a plan view of a front end portion of the head suspension assembly.
Figure 7:
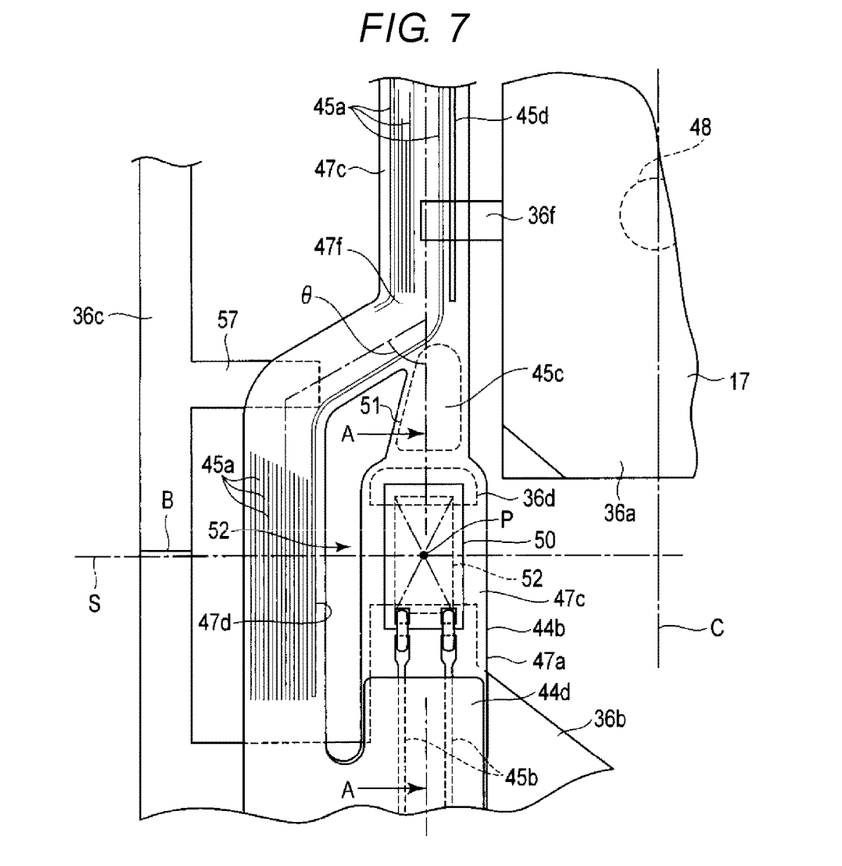
FIG. 7 is a plan view illustrating an expanded part of a gimbal portion of the head suspension assembly.

FIG. 5 is an exploded perspective view illustrating the piezoelectric element, the flexure, the load beam, and the magnetic head of the suspension assembly 30, FIG. 6 is a plan view of a front end portion of the suspension assembly 30, and FIG. 7 is a plan view illustrating an expanded part of the gimbal portion.

As illustrated in FIGS. 3 to 7, the flexure 40 includes a metal thin plate (backing layer) 44a such as stainless steel which becomes a base, a base insulating layer 44b formed on the metal thin plate 44a, a plurality of signal wires 45a formed on the base insulating layer 44b, a conductive layer (wiring pattern) 44c which makes up a drive wire 45b, and a cover insulating layer (protection layer) 44d (refer to FIG. 7) which covers the conductive layer 44c and is formed on the base insulating layer 44b, and is configured with a stacked plate of a long and narrow strip shape. In the front end side portion 40a of the flexure 40, the metal thin plate 44a side is affixed to the load beam 35 and onto a front surface of the base plate 42, or is spot-welded to a plurality of welding points 70.

In the gimbal portion 36 of the flexure 40, the metal thin plate 44a includes a rectangular tongue portion (support portion) 36a which is positioned on a front end side, a rectangular base end portion (base end plate portion) 36b which is interposed between the tongue portion 36a and a space portion 36e and is positioned on a base end side, a pair of long and narrow outriggers (link portion) 36c which extends from the tongue portion 36a to the base end portion 36b, a pair of separated plate portions 36d having an island shape provided in the space portion 36e between the tongue portion 36a and the base end portion 36b, and a pair of handles (support protrusions) 36f which protrudes from both side edges of the tongue portion 36a toward both sides thereof.

The base end portion 36b is fixed onto a front surface of the load beam 35 by spot welding. The base end portion 36b has a shape extending from the welding point 70, but there may be a notch or a slit in midstream. The tongue portion 36a is formed to have a size and a shape on which the magnetic head 17 can be mounted, and is formed in a substantially rectangular shape. The tongue portion 36a is disposed such that a center axis line in a width direction thereof coincides with a center axis line C of the suspension 34. In addition, a substantially central portion of the tongue portion 36a is in contact with a dimple (projection portion) 48 which protrudes from a front end portion of the load beam 35. Furthermore, the tongue portion 36a can be displaced in various directions as the pair of outriggers 36c is elastically deformed. Thereby, the tongue portion 36a and the magnetic head 17 which is mounted on the tongue portion 36a move in a roll direction and a pitch direction in accordance with a change of the magnetic disk 16, and can maintain a small gap between a front surface of the magnetic disk 16 and the magnetic head 17. The pair of handles 36f is formed as one piece with the tongue portion 36a by the metal thin plate 44a, and protrudes in a direction approximately orthogonal to the center axis line C from both side edges of the tongue portion 36a. The handle 36f is not limited to the metal thin plate 44a only, and may be configured with the conductive layer 44c stacked on the metal thin plate 44a, the base insulating layer 44b, and the cover insulating layer 44d.

In the gimbal portion 36, a part of the base insulating layer 44b of the flexure 40 is divided into two portions and the two portions are positioned on both sides of the center axis line C of the suspension 34. The base insulating layer 44b includes a base end portion 47a fixed on the base end portion 36b of the metal thin plate 44a, a front end portion 47b affixed on the tongue portion 36a, a first bridge portion 47c which is a pair of strips that extends from the base end portion 47a to the front end portion 47b with passing over the separated plate portion 36d, and a second bridge portion 47d which is a pair of strips that extends from the base end portion 47a to a medium portion of the first bridge portion 47c along with the first bridge portion 47c and joins the first bridge portion 47c. The first bridge portion 47c is positioned along with the outrigger 36c on both sides of the tongue portion 36a, and extends in approximately parallel with the center axis line C of the suspension 34, that is, extends in a longitudinal direction of the load beam 35. In addition, the first bridge portion 47c extends over the handle 36f and a crossbar of the outriggers 36c, and is partially fixed to these. The outrigger 36c may be provided between the tongue portion 36a and the first bridge portion 47c, and in this case, a part of the first bridge portion 47c is fixed to the handle 36f.

As illustrated in FIGS. 6 and 7, each of the second bridge portions 47d is positioned between the first bridge portion 47c and the outriggers 36c, and extends along with these. The second bridge portion 47d joins the first bridge portion 47c at a junction portion 47f near the handles 36f. In the junction portion 47f, an angle θ formed by the first bridge portion 47c and the second bridge portion 47d is greater than or equal to 45 degrees and is less than 90 degrees. The pair of separated plate portions 36d having an island shape of the metal thin plate 44a is fixed on a lower surface of the first bridge portion 47c between the junction portion 47f and the base end portion 47a.

In the gimbal portion 36, the conductive layer 44c includes the plurality of signal wires 45a which extend from the base end portion 47a of the base insulating layer 44b to the front end portion 47b through the second bridge portion 47d, the junction portion 47f, and the first bridge portion 47c, and the plurality of drive wires 45b which extend from the base end portion 47a to a medium portion of the first bridge portion 47c. The signal wires 45a are connected to a plurality of electrode pads 40d which are provided in the front end portion 47b. In addition, the conductive layer 44c includes a reinforcing wiring portion 45c formed on the first bridge portion 47c near the junction portion 47f and the separated plate portion 36d. The conductive layer 44c may include a dummy wire 45d which extends to the handles 36f on the first bridge portion 47c, or a ground wire. The drive wire 45b may extend from the base end portion 47a to a medium portion of the first bridge portion 47c.

As illustrated in FIG. 7, the reinforcing wiring portion 45c is positioned on the first bridge portion 47c, between the separated plate portions 36d and the junction portion 47f. In the present embodiment, the reinforcing wiring portion 45c and the first bridge portion 47c include a slope edge 51 which inclines so as to be tapered toward the center axis line C of the suspension from the separated plate portions 36d side (drive element side which will be described below) toward the junction portion 47f. That is, by providing the slope edge 51, a pivot center position of the magnetic head 17 can be adjusted to be on the suspension center axis line C in accordance with an expansion/contraction operation of the piezoelectric element 50 which will be described below.

As illustrated in FIG. 6, in the gimbal portion 36, the first bridge portion 47c, the second bridge portion 47d, the outrigger 36c, and the wires 45a and 45b are positioned on both sides of the tongue portion 36a, and are formed in a bilaterally symmetrical shape with respect to the center axis line C of the suspension 34. In the present embodiment, the gimbal portion 36 includes an auxiliary bridge 57 bridged to the outrigger 36c and the second bridge portion 47d near the junction portion 47f. The auxiliary bridge 57 is formed by a protrusion of the metal thin plate 44a extending from the outrigger 36c.

In one embodiment, the magnetic head 17 illustrated in FIGS. 3 to 7 is fixed to the tongue portion 36a by adhesive. The magnetic head 17 is disposed such that a center axis line thereof coincides with the center axis line C of the suspension 34, and a substantially center portion of the magnetic head 17 is positioned on the dimple 48. A recording reproducing element of the magnetic head 17 are electrically coupled to the plurality of electrode pads 40d of the front end portion 47b by conductive adhesive such as solder or silver paste. Thereby, the magnetic head 17 is connected to the signal wires 45a for transmitting recording/reproducing signals through the electrode pads 40d.

The pair of piezoelectric elements 50 which functions as a drive member or a drive element uses, for example, a thin film piezoelectric element (PZT element) of a rectangular plate shape. The piezoelectric element 50 is not limited to a thin film shape (thickness of approximately 10 μm), and may use a piezoelectric element of a bulk shape or a bulk stacking type (thickness of 50 μm or greater). In addition, the piezoelectric element 50 is not limited to a PZT element, and may use other piezoelectric elements. Furthermore, the drive element is not limited to the piezoelectric element 50, and may use other drive elements which can be expanded and contracted by an applied voltage.

In one embodiment, each of the piezoelectric elements 50 illustrated in FIGS. 6 and 7 is affixed on an upper surface of the first bridge portion 47c by adhesive or the like. That is, the first bridge portion 47c which is configured with the base insulating layer 44b includes a lower surface facing the metal thin plate 44a and an upper surface positioned on a side opposite to the lower surface. The piezoelectric elements 50 are affixed on the upper surface of the first bridge portion 47c. The piezoelectric elements 50 are disposed such that longitudinal directions (expansion/contraction directions) thereof are parallel with longitudinal directions of the load beam 35 and the first bridge portion 47c. Thereby, the two piezoelectric elements 50 are disposed in parallel with each other, and are disposed on the left and the right sides of the magnetic head 17. The piezoelectric element 50 may be disposed at an angle to the longitudinal direction of the first bridge portion 47c, and the two piezoelectric elements 50 may be disposed in an inverted V shape.

There is a gap between the separated plate portion 36d and the base end portion 36b of the metal thin plate 44a, and the piezoelectric element 50 is disposed on the base insulating layer 44b (first bridge portion 47c) so as to span the gap. One end portion of the piezoelectric element 50 in the longitudinal direction (expansion/contraction direction) is positioned to overlap the base end portion 36b of the metal thin plate 44a, and adheres to the first bridge portion 47c in a state where the other end portion in the longitudinal direction is positioned to overlap the separated plate portions 36d. Each of the piezoelectric elements 50 is electrically connected to the drive wire 45b for transmitting the drive signal.

Each of the piezoelectric elements 50 includes, for example, a rectangular drive region 52 which actually performs expansion/contraction operations. One end portion of the drive region 52 in a longitudinal direction (expansion/contraction direction) is positioned to overlap the base end portion 36b of the metal thin plate 44a, and the other end portion in the longitudinal direction is positioned to overlap the separated plate portions 36d. The center P of the drive region 52 is positioned in an approximately medium portion between the separated plate portion 36d and the base end portion 36b.

Figure 8:
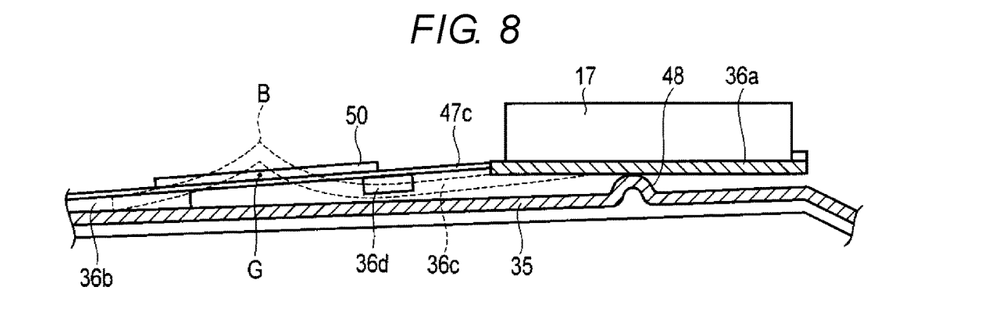
FIG. 8 is a sectional view of the gimbal portion along a center axis line of FIG. 6.
Figure 9:
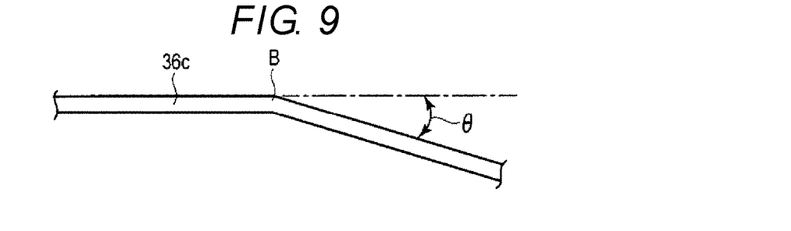
FIG. 9 is a view schematically illustrating a bending state of an outrigger of the head suspension assembly.

FIG. 8 is a sectional view of the gimbal portion along the center axis line C of FIG. 6, and FIG. 9 is a view schematically illustrating a bending portion of the outrigger. As illustrated in FIGS. 6 to 8, each of the pair of outriggers 36c has a part which is bent toward the load beam 35 side (dimple 48 side), and increases pushing amount toward the dimple 48 side. By elasticity of the pair of outriggers 36c, the tongue portion 36a and the magnetic head 17 are pressed against the dimple 48, and stronger contact force is generated between the tongue portion 36a and the dimple 48.

In the present embodiment, a bending portion B of each of the outriggers 36c is provided along a straight line S (or a straight line extending in a direction orthogonal to the outrigger 36c passing through the center P) passing through the centers P of the drive region 52 of the pair of piezoelectric elements 50, or is provided to be offset longitudinally from the straight line S in a range of ±0.1 mm. As illustrated in FIG. 9, a bending angle θ of the bending portion B of the outriggers 36c is set to, for example, 10 to 30'. In addition, for example, a press process or a process of bending the bending portion by irradiating the bending portion with laser light thereby locally heating the bending portion can be used for the bending process.

By putting the bending position of the outrigger 36c, that is, the bending portion B along the aforementioned straight line S or near the straight line S, the center of gravity G of the outriggers 36c in a region near the piezoelectric element 50 and the center of gravity G of the piezoelectric element 50 are approximately the same, as illustrated in FIG. 8.

Figure 10:
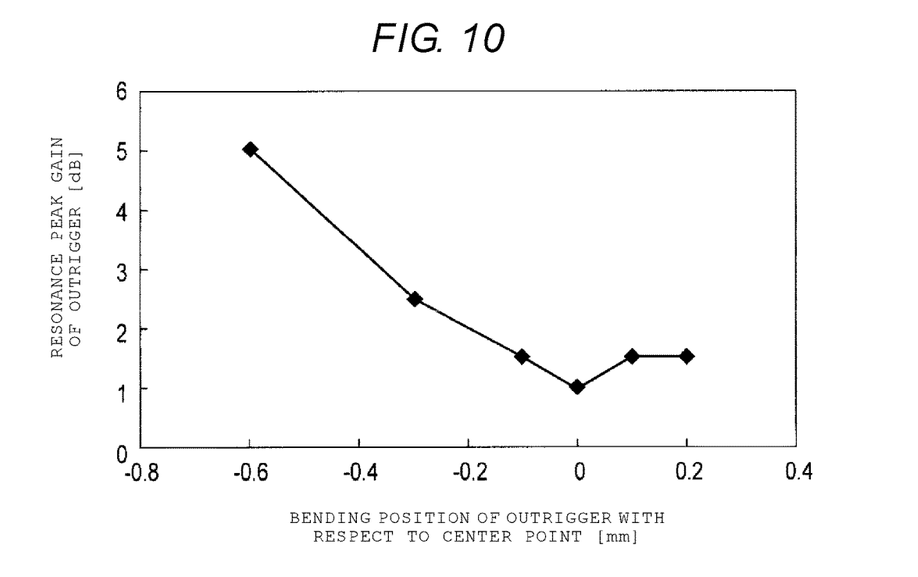
FIG. 10 is a diagram illustrating a relationship between a bending position of the outrigger and resonance peak gain.

Resonance suppression effects of the outriggers 36c are obtained by setting the bending position (bending portion B) of the outriggers 36c as described above. FIG. 10 illustrates a relationship between the bending position of the outrigger and a magnitude of gain (dB) of resonance of the outrigger. In FIG. 10, a horizontal axis denotes the amount of longitudinal offset (the amount of longitudinal offset from the straight line S) with respect to the centers P of the piezoelectric elements 50. In a case where the bending portion B is positioned in −0.4 to −0.6 mm to a base end side (base side) of the outriggers 36c, large resonance of the outrigger occurs. In contrast to this, if the bending portion B of the outriggers 36c coincides with the position of the center P of the piezoelectric element 50 as described in the present embodiment, that is, if the amount of longitudinal offset from the straight line S is zero, it can be seen that resonance gain of the outriggers 36c is minimized. The bending portion B may not be in the same position as the center P of the piezoelectric element 50, and, for example, in a case where the bending portion is in a range of ±0.1 mm from the same position as the center P, or a range between the center P and the dimple 48, sufficient resonance suppression effects can be obtained.

Meanwhile, as illustrated in FIG. 1, the HSA 22 includes a support frame extending in a direction opposite to the arm 32 from the rotatable bearing unit 28, and a voice coil which configures a part of the VCM 24 is buried in the support frame. In a state where the HSA 22 is incorporated onto the base 12, each of the magnetic disks 16 is positioned between two suspension assemblies 30. When the HDD operates, the magnetic heads 17 of the suspension assemblies 30 respectively face an upper surface and a lower surface of the magnetic disk 16, and are positioned both surface sides of the magnetic disk 16. The voice coil fixed to the support frame is positioned between a pair of yokes 37 fixed on the base 12, and the yokes 37 and a magnet (not illustrated) fixed to one yoke 37 configure the VCM 24.

As illustrated in FIG. 1, the substrate unit 21 includes a main flexible printed circuit board (Hereinafter, referred to as a main FPC) 21b extending from a main body 21a. An extending end of the main FPC 21b configures a connection end portion, and is fixed near the rotatable bearing unit 28 of the HSA 22. A connection end portion 40c of the flexure 40 of each of the suspension assemblies 30 is mechanically and electrically connected to a connection end portion of the main FPC 21b. Thereby, the substrate unit 21 is electrically connected to the magnetic head 17 and the piezoelectric element 50 through the main FPC 21b and the flexure 40.

Figure 11:
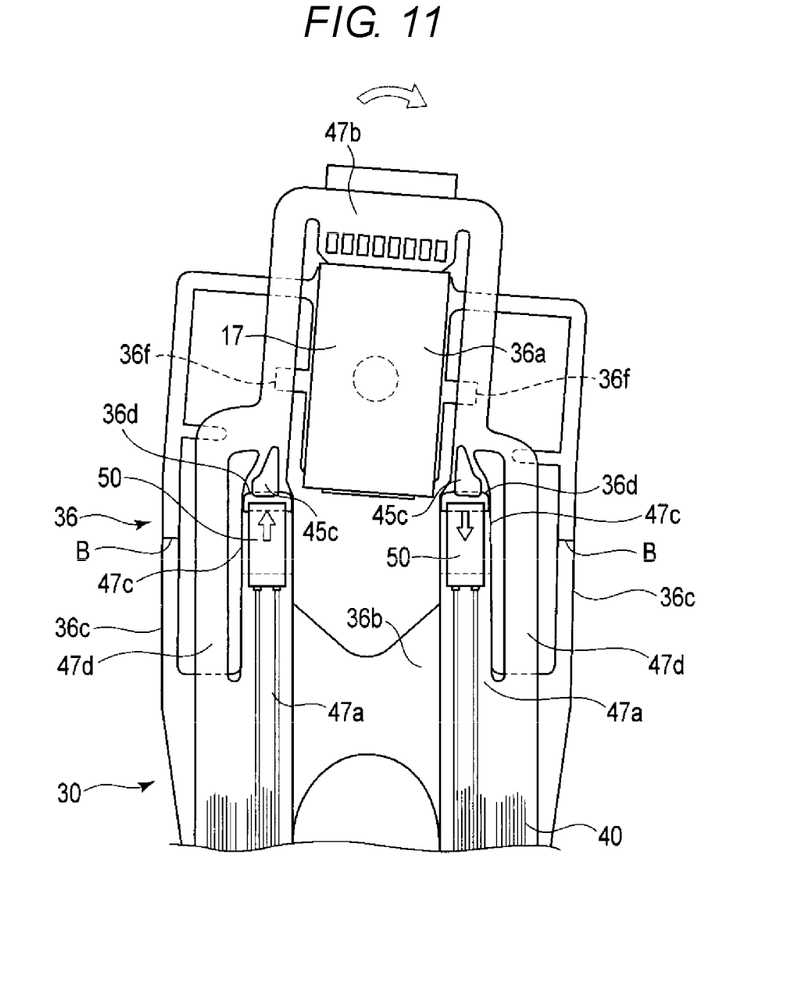
FIG. 11 is a plan view of the head suspension assembly schematically illustrating a micro displacement state of the magnetic head which is made by the piezoelectric element.

According to the HDD and the suspension assembly 30 which are configured as described above, a drive signal (for example, voltage) is applied to the piezoelectric element 50 through the drive wire 45b of the flexure (wiring member) 40, and thereby, the piezoelectric element 50 expands and contracts in the longitudinal direction (surface direction) thereof. As illustrated in FIG. 11, by driving the two piezoelectric elements 50 in opposite expansion/contraction directions, the tongue portion 36a of the gimbal portion 36 is swung through the first bridge portion 47c, and thereby, the magnetic head 17 can be displaced in a seek direction (cross track direction). Thereby, the voltage which is applied to the piezoelectric element 50 is controlled, and thereby, a position of the magnetic head 17 can be finely controlled, and positioning accuracy of the magnetic head can increase.

In addition, in the suspension assembly 30, the bending position of the outriggers 36c, that is, the bending portion B is provided on a straight line passing through the center P of the piezoelectric element 50 or near the straight line, and thereby, it is possible to coincide a gravity center position of the outriggers 36c with a gravity center position of the piezoelectric element 50 in a height direction. Thereby, the resonance suppression effects of the outriggers 36c are obtained. Accordingly, even when the piezoelectric element 50 performs expansion/contraction operations, resonance of the outriggers 36c can be suppressed, and thus, vibration of the magnetic head 17 is suppressed, and a position of the magnetic head 17 can be more accurately controlled.

As described above, according to the present embodiment, it is possible to provide a suspension assembly, a head suspension assembly, and a disk device including the same, which can increase positioning accuracy of a head.

Exemplary embodiments of the present disclosure are described, but the embodiments are presented just as examples, and are not intended to limit the scope of the exemplary embodiments of the present disclosure. A novel embodiment can be implemented in other various forms, and can be omitted, replaced, and modified in a range without departing from the gist of the exemplary embodiments of the present disclosure. The embodiment includes the scope or the gist of the exemplary embodiments of the present disclosure, and is included in the exemplary embodiments of the present disclosure described in the scope of Claims and a range of equivalents thereof.

For example, in the aforementioned embodiments, the pair of piezoelectric elements 50 is attached to the gimbal portion 36, and is configured to be positioned on the base end side of the load beam 35 with respect to the magnetic head 17, but is not limited to this. The pair of piezoelectric elements 50 may be disposed on, for example, both sides of the support portion (tongue portion) supporting the magnetic head in a width direction, and may be parallel with the magnetic head. The piezoelectric elements are not limited to one pair of piezoelectric elements, and may use, for example, one piezoelectric element provided on the front end side of the slider.

According to the aforementioned embodiments, the arm of the HSA uses the arm of an independent plate shape, but is not limited to this, and may employ a plurality of arms of a so-called E block shape and a bearing sleeve which are formed as one piece. The magnetic disk is not limited to 2.5 inches, and may be a magnetic disk of a different size. The number of magnetic disks are not limited to two, and may be one, three or more. The number of suspension assemblies may also increase or decrease in accordance with the number of installed magnetic disks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A suspension assembly comprising:
    a support plate that includes a front end portion in which a projection portion is formed along a center longitudinal axis of the suspension assembly;
    a wiring member that includes
        a metal plate on the support plate, the metal plate including a base end plate portion which is fixed to the support plate, a support portion which is separated from the base end plate portion and is positioned on the projection portion, and a pair of link portions which extend on both sides of the support portion and connect the base end plate portion to the support portion,
        an insulating layer on the metal plate, the insulating layer including a first end portion on the support portion, and a pair of bridge portions which are respectively provided in parallel with the link portions and extend from a second end portion that is on the base end plate portion to the first end portion, and
        a conductive layer on the insulating layer, the conductive layer having a plurality of wires, the conductive layer including a plurality of wires which extend from the second end portion to the first end portion; and
    a driving element affixed to one of the bridge portions, the driving element deforming in response to a voltage applied thereto to move the support portion,
    wherein each of the link portions includes a bent portion that is bent at a location thereof that is substantially aligned with a straight line that extends in a direction orthogonal to the center longitudinal axis and passes through a central region of the driving element.

2. The suspension assembly according to claim 1, wherein a bending angle of the bent portion of the link portions is 10 to 30 degrees.

3. The suspension assembly according to claim 2, wherein the bent portion is raised with respect to the support plate more than other portions of the link portions.

4. The suspension assembly according to claim 3, wherein a vertical center of gravity of the driving element is at about a same level as a vertical center of gravity of the link portions.

5. The suspension assembly according to claim 1, wherein the metal plate includes a separated plate portion that is positioned between the base end plate portion and the support portion and the driving element has a first end supported on the base end plate portion and a second end supported on the separated plate portion.

6. The suspension assembly according to claim 1, wherein the location of the bent portion is aligned with a center of the driving element along the direction orthogonal to the center longitudinal axis or offset in a direction of the center longitudinal axis by no more than ±0.1 mm.

7. The suspension assembly according to claim 6, wherein the location of the bent portion is offset in the direction of the center longitudinal axis to be closer to the projection portion of the support plate than when the location of the bent portion is not offset.

8. A magnetic head suspension assembly comprising:
a magnetic head;
a support plate that includes a front end portion in which a projection portion is formed along a center longitudinal axis of the suspension assembly;
a wiring member that includes
a metal plate on the support plate, the metal plate including a base end plate portion which is fixed to the support plate, a support portion which supports the magnetic head, is separated from the base end plate portion, and is positioned on the projection portion, and a pair of link portions which extend on both sides of the support portion and connect the base end plate portion to the support portion,
an insulating layer on the metal plate, the insulating layer including a first end portion on the support portion, and a pair of bridge portions which are respectively provided in parallel with the link portions and extend from a second end portion that is on the base end plate portion to the first end portion, and
a conductive layer on the insulating layer, the conductive layer having a plurality of wires, the conductive layer including a plurality of wires which extend from the second end portion to the first end portion; and
a driving element affixed to one of the bridge portions, the driving element deforming in response to a voltage applied thereto to move the support portion and the magnetic head,
wherein each of the link portions includes a bent portion that is bent at a location thereof that is substantially aligned with a straight line that extends in a direction orthogonal to the center longitudinal axis and passes through a central region of the driving element.

9. The magnetic head suspension assembly according to claim 8, wherein a bending angle of the bent portion of the link portions is 10 to 30 degrees.

10. The magnetic head suspension assembly according to claim 9, wherein the bent portion is raised with respect to the support plate more than other portions of the link portions.

11. The magnetic head suspension assembly according to claim 10, wherein a vertical center of gravity of the driving element is at about a same level as a vertical center of gravity of the link portions.

12. The magnetic head suspension assembly according to claim 8, wherein the metal plate includes a separated plate portion that is positioned between the base end plate portion and the support portion and the driving element has a first end supported on the base end plate portion and a second end supported on the separated plate portion.

13. The magnetic head suspension assembly according to claim 8, wherein the location of the bent portion is aligned with a center of the driving element along the direction orthogonal to the center longitudinal axis or offset in a direction of the center longitudinal axis by no more than ±0.1 mm.

14. The magnetic head suspension assembly according to claim 13, wherein the location of the bent portion is offset in the direction of the center longitudinal axis to be closer to the projection portion of the support plate than when the location of the bent portion is not offset.

15. A disk device comprising:
a disk;
a magnetic head configured to read data from and write data onto the disk as the disk is rotating;
a support plate that includes a front end portion in which a projection portion is formed along a center longitudinal axis of a suspension assembly;
a wiring member that includes
a metal plate on the support plate, the metal plate including abase end plate portion which is fixed to the support plate, a support portion which supports the magnetic head, is separated from the base end plate portion, and is positioned on the projection portion, and a pair of link portions which extend on both sides of the support portion and connect the base end plate portion to the support portion,
an insulating layer on the metal plate, the insulating layer including a first end portion on the support portion, and a pair of bridge portions which are respectively provided in parallel with the link portions and extend from a second end portion that is on the base end plate portion to the first end portion, and
a conductive layer on the insulating layer, the conductive layer having a plurality of wires, the conductive layer including a plurality of wires which extend from the second end portion to the first end portion; and
a driving element affixed to one of the bridge portions, the driving element deforming in response to a voltage applied thereto to move the support portion and the magnetic head,
wherein each of the link portions includes a bent portion that is bent at a location thereof that is substantially aligned with a straight line that extends in a direction orthogonal to the center longitudinal axis and passes through a central region of the driving element.

16. The disk device according to claim 15, wherein a bending angle of the bent portion of the link portions is 10 to 30 degrees, and the bent portion is raised with respect to the support plate more than other portions of the link portions.

17. The disk device according to claim 16, wherein a vertical center of gravity of the driving element is at about a same level as a vertical center of gravity of the link portions.

18. The disk device according to claim 15, wherein the metal plate includes a separated plate portion that is positioned between the base end plate portion and the support portion and the driving element has a first end supported on the base end plate portion and a second end supported on the separated plate portion.

19. The disk device according to claim 15, wherein the location of the bent portion is aligned with a center of the driving element along the direction orthogonal to the center longitudinal axis or offset in a direction of the center longitudinal axis by no more than ±0.1 mm.

20. The disk device according to claim 19, wherein the location of the bent portion is offset in the direction of the center longitudinal axis to be closer to the projection portion of the support plate than when the location of the bent portion is not offset.

* * * * *